United States Patent

[11] 3,616,877

[72] Inventor: Richard L. Collins, Vandalia, Ohio
[21] Appl. No.: 886,084
[22] Filed: Dec. 18, 1969
[45] Patented: Nov. 2, 1971
[73] Assignee: General Motors Corporation, Detroit, Mich.

[54] SLIDING CALIPER DISC BRAKE AND GUIDE AND RETENTION MEANS THEREFOR HAVING RESILIENT BUSHINGS
4 Claims, 3 Drawing Figs.

[52] U.S. Cl. .................................................. 188/73.3, 188/73.6
[51] Int. Cl. ........................................................ F16d 65/02
[50] Field of Search ............................................ 188/71.1, 72.1, 72.4, 73.3, 73.4, 73.5, 73.6, 205.3

[56] References Cited
UNITED STATES PATENTS
3,265,160  8/1966  Elberg et al. ................... 188/73.6

Primary Examiner—George E. A. Halvosa
Attorneys—W. E. Finken and D. D. McGraw

ABSTRACT: A sliding caliper disc brake in which a stationary carrier and a caliper housing have registering grooves formed in their torque-carrying abutment faces. Guide and retention means received in the grooves act as retention keys which permit sliding movement of the caliper housing relative to the carrier member, sliding movement of the guide and retention means in relation to the carrier member and the caliper housing with abutments limiting the sliding movement relative to the carrier member, the guide and retention means also mounting the brake pad assemblies in the caliper housing for sliding movement. Each guide and retention means includes a sleeve member with rubberlike bushings therein, and a pin inserted axially through the sleeve and the bushings to hold the brake assembly together. With only the sleeve member in place, the brake pad assemblies are held in the caliper housing and the caliper housing can be later installed in position on the carrier member with the brake pad assemblies in place. When the pin is inserted with the caliper assembly in place on the carrier, the caliper housing, together with the brake pad assemblies, is retained against radial movement. The guide and retention means has a resilient shock load absorbing arrangement including the rubberlike-bushing means which permits the brake torque to be transmitted through the abutment faces while preventing radial movement and undamped torque transfer.

PATENTED NOV 2 1971  3,616,877

INVENTOR.
Richard L. Collins
BY
D. D. McGraw
ATTORNEY

SLIDING CALIPER DISC BRAKE AND GUIDE AND RETENTION MEANS THEREFOR HAVING RESILIENT BUSHINGS

The invention relates to a disc brake assembly having a sliding caliper mounted in a stationary support bracket and guide and retention means arranged to be relatively slidable in relation to the support bracket and caliper housing. It more particularly relates to such an assembly in which the brake pad assemblies are capable of preassembly in the caliper housing, held in position by one element of the guide and retention means, and, when installed on the support bracket over the disc to be braked another element of the guide and retention means cooperating with the first elements provides a radial key lock between the caliper housing and the support bracket. The invention further relates to the specific guide and retention means construction including the provision of resilient bushings in a sleeve member with a pin extending axially through the bushings and the sleeve member.

Figure 1:
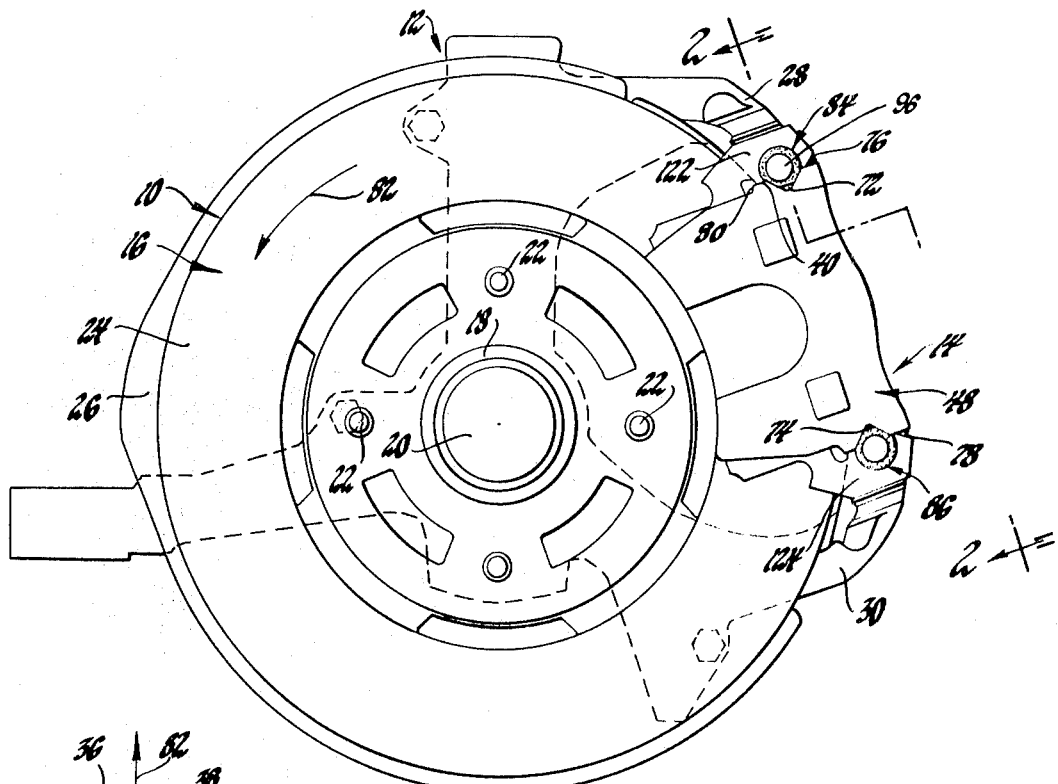
FIG. 1 is a side elevation view of a vehicle front disc brake assembly embodying the invention.

The disc brake assembly 10 illustrated in FIG. 1 includes an integral steering knuckle and mounting bracket 12 which provides a stationary carrier member or support frame for the caliper assembly 14. The caliper assembly is formed as a clamping member straddling a portion of the brake disc or rotor 16 and mounted for sliding movement in directions substantially parallel to the axis of rotation of the rotor 16. Since the particular brake assembly illustrated is provided for a vehicle front wheel, the steering knuckle provided is a part of the stationary carrier member 12. However, the brake assembly may be utilized on wheels other than steering wheels and, therefore, the carrier member in such installations would not include the steering knuckle. Also, as is well known in the art, the mounting bracket may be formed separately and attached to a stationary part providing a support frame. As seen in FIG. 1, the rotor 16 has a hub section 18 through which a suitable stub axle formed as a part of the steering knuckle portion of the carrier member 12 is received to rotatably mount the rotor. Since the view is from the outer side in relation to the vehicle, only the bearing cap 20, which covers the stub axle and bearing arrangement, is shown. Suitable wheel mounting studs 22 are provided on the portion of the rotor assembly intermediate the rotor braking surface annulus 24 and the hub section 18. A suitable shield 26 is also illustrated as being attached to the support frame 12.

The support member 12 has a pair of arms 28 and 30 which extend outwardly alongside the rotor 16, and immediately beyond the rotor periphery extend partially over the rotor periphery. As is better seen in FIG. 2, the arms are generally similar in arrangement. Therefore, arm 28 will be described in further detail, with arm 30 being similarly constructed. Near its outer end, arm 28 is formed with a yokelike cross section which provides arm sides 32 and 34. These sides are spaced apart axially and provide a space therebetween in which one of the brake pad assemblies is inserted. It should be noted that when axial directions are referred to herein and not otherwise set forth, the reference is being made in terms of the rotational axis of the rotor 16, or other axis lines which are substantially parallel to this axis. Similarly, transverse directions not otherwise set forth relate to directions substantially perpendicular to the opposed friction braking surfaces 36 and 38 of the rotor annulus section 24. These surfaces are parallel to the plane of rotation of the rotor and define the axial limits of two such planes. In accordance with common practice, any plane between and including these surfaces and parallel to the plane of rotation of the rotor is referred to as the plane of the rotor.

Arm side 32 is preferably positioned intermediate the planes in which the surfaces 36 and 38 are positioned so that major portions of the braking forces are transmitted to the support frame 12 in line with the rotor 16. Arm side 32 may also extend axially beyond the planes of surfaces 36 and 38. The outer ends of the arm sides 32 and 34 are provided with abutment surfaces 40. Theses surfaces or faces appear in lines in FIGS. 1 and 3. The arm sides are also respectively provided with grooves 44 and 46 which define groove means formed in the carrier member. These grooves extend transversely and are open through the abutment faces 40. Grooves 44 and 46 are axially aligned with their common axis being substantially parallel to the axis of rotor 16. The bases of the grooves are preferably semicircular in configuration since they are provided to engage a circular member to be described.

The clamping member or caliper assembly 14 includes the caliper frame or housing 48. The housing is illustrated as being of the single piston type in which a cylinder 50 is formed in one side of the housing, and a brake actuating piston 52 is mounted in the cylinder 50 to form therewith a pressure chamber 54 and for hydraulic brake actuation. A suitable pressure fitting 55 is provided to connect chamber 54 with the remainder of the brake hydraulic system. The piston is provided with suitable seal means 56 and boot 58. The other end of piston 52 from pressure chamber 54 engages the backing plate 60 of the brake pad assembly 62 so that the brake lining 64 is forced into engagement with the friction braking surface 38 of the rotor 16. Reaction to the direct application of the pad assembly 62 to one face of the rotor and increased hydraulic pressure in chamber 54 effects axial movement of the clamping member 14 in the opposite direction so that the portion of the caliper frame on the other side of the rotor 16 applies the other brake pad assembly 66 to the other friction braking surface 36 of the rotor. Brake pad assembly 66 is also constructed to include a backing plate 68 and brake lining 70. Other piston arrangements may be provided as a part of the caliper assembly 14 without departing from the invention. For example, more than one piston and cylinder arrangement may be provided on one side of the rotor, or different piston and cylinder arrangements on both sides of the rotor may be provided.

The caliper frame or housing 48 is provided with grooves 72 and 74 at its circumferentially spaced ends, these grooves being respectively formed through the abutment faces 76 and 78 formed on each circumferentially spaced end thereof. The abutment faces are similar in configuration and, therefore, the circumferentially spaced end in which groove 72 is formed will be described in further detail. This is the end of the caliper frame cooperating with completely described arm 28 of the carrier member.

Figure 2:
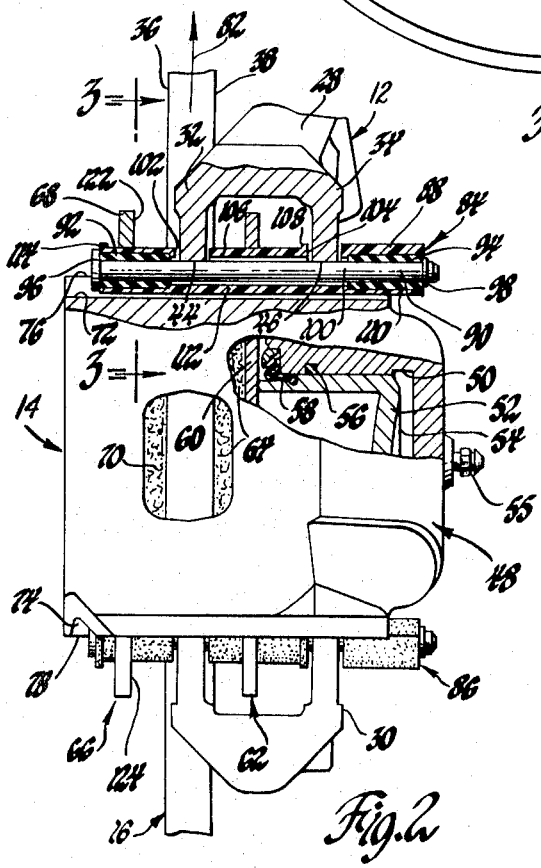
FIG. 2 is a view, partially in section and with parts broken away, of the disc brake assembly of FIG. 1, taken in the direction of arrows 2—2 of that FIG.
Figure 3:
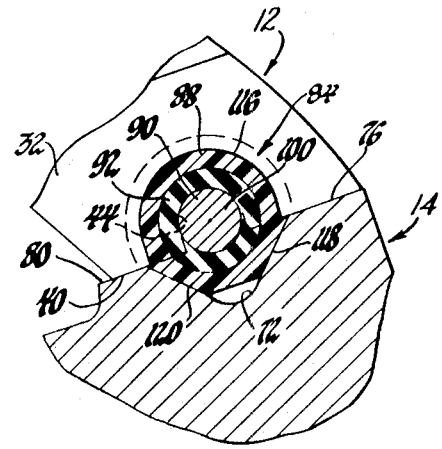
FIG. 3 is a fragmentary cross-sectional view of a portion of the disc brake assembly of FIG. 1, with parts broken away, taken in the direction of arrows 3—3 of FIG. 2.

As shown in greater detail in FIG. 3, groove 72 divides the abutment face 76 into radially inner and outer portions. Since the groove 72 also registers with the aligned grooves 44 and 46 of arm sides 32 and 34, these portions of the abutment face 76 mate with similar portions of abutment faces 40. These faces are in abutting engagement along a line as seen in FIGS. 1 and 3, this line illustrating a plane referred to as the abutment interface 80. The brake force generated when the brake is actuated is transmitted from the brake pad assemblies 62 and 66 to the caliper frame 48 and, through the abutment means defining the abutment interface 80, to the arm sides 32 and 34, and, therefore, to the stationary carrier member 12. This occurs when the disc is rotating in the direction or arrow 82 as seen in FIGS. 1 and 2. When the disc is rotating in the opposite direction, the caliper frame abutment face 78 transmits the braking force to the abutment faces similarly formed on arm 30.

The guide and retention means 84 and 86 guide and retain the caliper assembly in relation to the stationary carrier member 12. Each guide and retention means is preferably formed as a pin, sleeve and resilient bushing assembly. Assembly 84 will therefore be described in greater detail, it being understood that assembly 86 is similarly constructed and utilized.

As is seen in cross section in FIGS. 2 and 3, assembly 84 includes a sleeve member 88 and a pin or rod member 90. The sleeve member is preferably made of a suitable polyamide resin such as nylon. Other resins having desirable heat, wear, friction, and forming characteristics may also be used. In some instances the sleeve member may have a metallic base and be coated with a suitable material such as nylon or a high molecular weight fluorocarbon resin such as tetrafluoroethylene, known as Teflon The preferred embodiment is to use nylon as the suitable resilient plastic material for the sleeve member 88. Sleeve member 88 is generically considered to have a generally cylindrical configuration even though it has some axially extending surfaces which are not arcuate in cross section. However, in the broadest aspects of the invention other configurations could be utilized.

The assembly also includes resilient rubberlike bushing means comprised of bushings 92 and 94. The bushings are respectively positioned internally of sleeve member 88 and adjacent each of the sleeve ends. Pin member 90 extends axially through the sleeve member and the bushings and is held in position by the pin head 96 at one end and a keeper 98 at the other end. The pin head and the keeper are each of greater diameter than the inner diameter of the nearest respective bushing but of less diameter than the outer diameter of the sleeve member 88. In this arrangement, the pin body 100 is round and is somewhat smaller than the interior wall of sleeve member 88. The pin body fits tightly within the bushings 92 and 94, which in turn fit tightly within sleeve member 88.

The sleeve member 88 is provided with chordal transverse slots 102 and 104, axially spaced to receive arm sides 32 and 34 therein, and each of a greater width than the associated arm side so that assembly 84 is capable of limited sliding movement relative to the carrier member 12. The slots 102 and 104 extend inwardly a sufficient distance to permit the pin body 100 to be engaged by the semi-circular bases of the grooves 44 and 46, as seen in FIG. 2. The slots also permit the abutment faces 40 to extend into abutting engagement with abutment face 76 along abutment interface 80. The center portion 106 of sleeve member 88 intermediate slots 102 and 104 is provided with a slightly raised flange 108 adjacent slot 104. Flange 108 forms an abutment which limits movement of brake pad assembly 62 in the direction of arm side 34, as will become more readily apparent in the description of the arrangement and mounting brake pad assemblies. The outer portion 110 of the sleeve member 88 beyond slot 104 has the bushing 94 mounted herein. The circular section of sleeve portion 110 is in peripheral axial alignment with the outer periphery of flange 108. The outer portion 112 of sleeve member 88 has the circular section thereof in peripheral axial alignment with the circular section of center portion 106, with the extreme outer end thereof being provided with a flange 114 similar to flange 108 and providing an abutment which limits the movement of brake pad assembly 66 relative to assembly 84, as will be more readily apparent in the description of the mounting of the pad assemblies. The resilient bushing 92 is positioned within the sleeve member outer portion 112.

As best shown in FIG. 3, a cross section of the assembly 84 taken through the outer portion 112 of the sleeve member shows the sleeve member to have a generally arcuate or circular outer surface section 116 and spaced flat side surface sections 118 and 120. Thus, the arcuate surface 116 is axially aligned with the axis of grooves 44 and 46 and the axis of pin body 100. Furthermore, the flat surfaces 118 and 120 mate with corresponding flat sides of groove 72. Thus, the flat surfaces 118 and 120 join the side surfaces of groove 72 along interfaces where the sliding action of the caliper frame 48 takes place with respect to the guide and retention means 84. The sliding action of the guiding and retention means with respect to the carrier member 12 takes place along interfaces formed by the base surfaces of grooves 44 and 46 and the pin body 100. The circumferential spacing of the bases of the grooves 44 and 46 of arm 28, relative to the similar grooves in arm 30, is slightly less than the spacing of the outer sides of the pins of guide and retention means 84 and 86 would be if they were inserted before placing the caliper in position on the support member. Thus, the pins press inwardly against the bushings toward the piston 52, resiliently preloading the bushings, when they are installed with the grooves of the caliper and the support member in registry.

The relative sliding movement between the brake pad assembly members 62 and 66 and the guide and retention means 84 takes place between the arcuate section of the sleeve member 88 and the backing plates 60 and 68. This is arranged by constructing each brake pad assembly in the following manner. The brake pad assembly 66 extends beyond the brake pad lining at either end to provide hooklike ends 122 and 124. These ends extend generally parallel to the arm sides 32 and 34, as seen in FIGS. 1 and 2, and are provided with substantially semicircular slots which fit over the outer portions of the sleeve members of each assembly 84 and 86. Brake pad assembly 62 is similarly constructed so that the slots in its ends fit the arcuate sections of the center portions of the sleeve members of the guide and retention means 84 and 86. This arrangement readily lends itself to the use of identical inner and outer brake pad assemblies so that separately designed and constructed inner and outer brake pad assemblies need not be provided.

It can be seen that assembly of the brake pad assemblies in the caliper frame 48 can be accomplished prior to mounting the caliper assembly on the carrier member. This is readily arranged by placing the sleeve members in their respective grooves 76 and 78, and moving each brake pad assembly radially outwardly inside the caliper frame so that the backing plate ends pass through the slots 102, and then moving pad assembly 62 toward abutment 108 and pad assembly 66 toward abutment 114. A temporary spacing member may then be placed between the linings 64 and 70 to space the linings somewhat farther apart than the thickness of the rotor 16 requires. This can be sufficient to hold the brake pad assemblies in position, with the backing plate 60 engaging piston 52, as shown. Thus, the caliper assembly with its brake pad assemblies can be transported and handled easily prior to its assembly on the carrier member and rotor. When the caliper assembly 14 is to be mounted on the carrier member, the spacer is removed and the caliper assembly is positioned radially outward of its installed position. It is then moved radially inward with the pad assembly 62 and 66 on either side of rotor 16 and with the arm sides 32 and 34 passing through slots 102 and 104 until the groove means of the caliper frame and the carrier member are in registry. Pin members 90 are then inserted through the sleeve members, slightly transversely preloading the bushing 92 and 94, and keepers 98 are installed. It can be seen that the sleeve members act as retention keys for the brake pad assemblies and that the pin members, in cooperation to the sleeve members, act as retention keys for the caliper frame relative to the carrier member.

The resilient means provided by bushings 92 and 94 provide for absorption of shock loads while permitting transfer of braking forces directly from the caliper frame to the carrier member. They also provide allowance for manufacturing tolerances. Thus, a single antirattle and guide and retention arrangement is provided which allows sliding movement required for brake applications, release, and adjustment, as the brake lines wear. It is to be understood that when the invention is described and defined as having the brake forces transmitted independently of the guide and retention means, or directly and bypassing the guide and retention means, or independently of the resilient supporting means, this does not preclude the exertion of relatively slight forces which will cause some very small deformation of the resilient part or parts of the guide and retention means until full brake force abutting engagement of the affected is obtained. The guide and retention means are not provided for nor intended to be brake force transmitting means which carry any appreciable or substantial amount of the brake load. Insofar as the transmittal of the brake load is concerned per se, the guide and retention means are not required, utilized or expected to so act. This principle likewise applies when the invention is described and defined as preventing or substantially preventing radial movement of the clamping member relative to the carrier member.

What is claimed is:

1. Guide and retention means for a disc brake assembly having a fixed support frame and a sliding caliper frame and brake pad assemblies and a rotor to be braked, said guide and retention means comprising:

a sleeve member adapted to provide a retention key for retaining the brake pad assemblies in the caliper frame while permitting sliding movement of the brake pad assemblies in directions substantially parallel to the sleeve member axis, a pin member removably positioned axially in said sleeve member and cooperating therewith to provide a retention key for limiting movement of the caliper frame relative to the support frame to sliding movement in directions substantially parallel to the sleeve member axis, and at least one of said members having resilient transverse shock load absorbing means for absorbing shock loads exerted between the frames transversely of the sleeve member axis, said resilient shock load absorbing means including rubberlike bushing means in said sleeve member and receiving said pin member therethrough and mounting said pin member in radially spaced relation to said sleeve member, said sleeve member having transverse chordal slot means provided therein, said slot means being of a greater axial width than the width of the portion of the fixed support frame adapted to engage said guide and retention means, for receiving the portion of the fixed support frame therein; said pin member extending through a part of said transverse chordal slot means for abutting engagement with said support frame transversely of said pin member; and said bushing means comprising a pair of rubberlike bushings each positioned intermediate an end of said sleeve member and said chordal slot means.

2. Guide and retention means for a disc brake assembly having a fixed support frame and a sliding caliper frame and brake pad assemblies and a rotor to be braked, said guide and retention means comprising:

a sleeve member adapted to provide a retention key for retaining the brake pad assemblies in the caliper frame while permitting sliding movement of the brake pad assemblies in directions substantially parallel to the sleeve member axis, a pin member removably positioned axially in said sleeve member and cooperating therewith to provide a retention key for limiting movement of the caliper frame relative to the support frame to sliding movement in directions substantially parallel to the sleeve member axis, and at least one of said members having resilient transverse shock load absorbing means for absorbing shock loads exerted between the frames transversely of the sleeve member axis, said resilient shock load absorbing means including rubberlike bushing means in said sleeve member and receiving said pin member therethrough and mounting said pin member in radially spaced relation to said sleeve member, said sleeve member being made of a resilient plastic material, and said bushing means including spaced annular bushings mounted internally of said sleeve member and receiving said pin member therethrough with a tight fit relative to said pin member and said sleeve member, said bushings normally holding said pin member and said sleeve member in radially spaced relation, said pin member having on one end a head of greater diameter than the inner diameter of the one of said bushings nearest said head, and a removable keeper received on the other end of said pin member and having a diameter greater than the inner diameter of the one of said bushings nearest said keeper and less than the outer diameter of said sleeve member, said pin member being axially removable from said bushings and said sleeve member upon removal of said keeper from said pin member.

3. A disc brake assembly comprising:

a brake rotor, a stationary carrier member having said rotor rotatably mounted relative thereto, a clamping member straddling a portion of the periphery of said rotor and slidably mounted on said carrier member, a pair of brake pad members on opposite sides of said rotor and in said clamping member, means for directly applying one of said pad members to one face of said rotor and by reaction effecting axial movement of said clamping member in the opposite direction to apply the other pad member to the other face of said rotor, first abutment means on said carrier member and second abutment means on said clamping member in abutting alignment with said first abutment means for limiting circumferential movement of said clamping member with respect to said carrier member, said first abutment means and said second abutment means having axially extending registering groove means therein, said groove means having base and sidewall means, and guiding and retention means for said clamping member and said brake pad members so that said brake pad members are carried thereby, said guiding and retention means being slidably mounted in said grooves so that axial relative movement is permitted between said guiding and retention means and each of said members, said guiding and retention means including axially apertured generally cylindrical means and pin means extending axially therethrough, and having resilient bushing means in said generally cylindrical means and receiving said pin means therethrough.

4. The disc brake assembly of claim 3, said resilient bushing means being transversely preloaded in the direction of said pad member direct applying means when said pin means is inserted therethrough; said pin means being engaged by the base means of said carrier member groove means and limited thereby in the circumferential direction to a position preloading said resilient bushing means.

* * * * *